United States Patent Office 3,150,959
Patented Sept. 29, 1964

3,150,959
RECOVERY OF MATTE FROM SULFIDIC COPPER ORES
William Wraith, Jr., Springfield, N.J., assignor to The Anaconda Company, a corporation of Montana
No Drawing. Filed Mar. 20, 1961, Ser. No. 96,658
2 Claims. (Cl. 75—7)

This invention relates to smelting processes for recovering matte from sulfidic copper ores and, in particular, to methods wherein concentrated sulfidic copper ore is calcined and then smelted to produce a molten slag and the desired copper matte. The new process is especially characterized in that the smelter charge is a blend of wet sulfidic ore concentrates and of dry calcine which may be substantially sulfur-free.

Perhaps the most common method of recovering copper from ores having a high sulfide content is the matte smelting process. It involves concentrating the ore, usually in a froth flotation cell, and then laundering the concentrate. After suitable thickening or filtering, the concentrate is roasted, in a multiple hearth furnace for example, to drive off excess sulfur and volatile impurities, and to oxidize a sufficient amount of the iron sulfide content so that there is only enough iron sulfide remaining in relation to the copper sulfide to produce matte of the desired composition. The calcine resulting from roasting is then charged into a smelter, generally a reverberatory furnace, where the sulfides of copper and iron melt together to form matte and the silicates, iron oxide and other impurities either volatilize or melt together to form slag.

The product of the roasting stage is a very dry and dusty granular calcine which in larger plants presents a difficult handling problem. It is usually transported in various types of cars to the smelter where it is charged into the reverberatory furnaces on demand. During all this handling, the calcine often spills and blows about and a great deal of noxious dust becomes suspended in the air, requiring all personnel in the area to use respirators and other protective equipment. Also, considerable calcine is lost this way.

Several marked improvements are achieved over such conventional matte smelting processes by the method of this invention. Broadly stated, the new method of recovering matte having a predetermined sulfur content for a sulfidic copper ore comprises the following sequence of steps. The ore is treated to produce a wet concentrate relatively rich in copper and having a sulfur content greater than the predetermined amount desired in the matte. Some of this wet concentrate is heated in an oxidizing atmosphere to oxidize at least part of the sulfur content thereof and produce a calcine having a sulfur content substantially lower than said predetermined amount. Preferably, substantially all the sulfur content of the concentrate is oxidized during this heating step to produce a substantially sulfur-free calcine. A sufficient quantity of the remainder of the wet concentrate is blended with the calcine to produce a blend having a sulfur content substantially equal to the predetermined amount. Finally, the blend is smelted to produce a copper matte containing the predetermined amount of sulfur.

In a preferred form of the invention, the dead-roasting of the small amount of wet concentrate may be carried out in a fluo-solids bed reactor where the desired portion of wet concentrate is conveyed into and oxidized within a heated reacting zone by means of a blast of air.

One of the major features of this method is that unoxidized wet concentrate is blended with the calcine while the calcine is still hot after emerging from the roasting furnace. Hence, it is possible to make a damp blend of wet concentrate and calcine which can be easily transported without the dust problems typical of ordinary calcine smelter charges. A further advantage of the method of the invention is that by dead-roasting the calcine into a substantially sulfur-free product the maximum amount of wet concentrate can be blended with the calcine to arrive at the desired iron and copper sulfide ratio. Significant savings in production time, labor costs, fuel energy etc. can be achieved by thus minimizing the amount of concentrate to be roasted. Also, greater dampening of the dusty calcine is permitted because of the relatively large amount of wet material in the blended smelter charge.

Taken alone, the blending of wet concentrates with dry calcine is in itself a considerable improvement over known smelting techniques because it greatly reduces the dust-control difficulties which are so severe when dry calcine alone constitutes a smelter charge. Similarly, the dead-roasting contemplated by this invention is a notable improvement by itself because it reduces as much as possible the amount of calcining necessary to achieve a smelter charge of the desired composition. Moreover, when these two features are combined in one method and a dead-roasted calcine is blended with a wet concentrate, a blended smelter charge results which has a closely controlled sulfide composition and moisture content and which can be balled into pellet form for easy handling and storage.

The advantages of the new matte smelting process will be apparent from the following description of an example of the invention.

A certain amount of sulfidic copper ore was concentrated in a froth flotation cell to remove gangue minerals and leave a concentrate having an iron and copper sulfide content considerably higher than that desired in the finished matte. Upon passing through a conventional launder, the concentrate was then ready for the steps of the invention. It is to be understood that the term "concentrate" as used herein, and particularly in the claims, also includes copper precipitates, cement copper, and other copper-bearing secondaries.

A portion of the concentrate was thickened, in cyclone apparatus for example, after leaving the launder to remove excess moisture and produce a wet concentrate containing from 13 to 18 percent water. This thickened concentrate was mixed with a sufficient amount of pulverized roaster flux material and introduced into a fluo-solids reactor. In the reactor, the bed was made up of silica sand secondaries and air was introduced into the bottom of the reactor up through the bed and also into an intermediate level above the bed. The primary air entering the bottom of the reactor was from 90 to 110 percent of theoretical and the secondary air entering the middle of the reactor was from 20 to 30 percent of theoretical. The concentrate was roasted in this reactor at 1350° F. to 1500° F. at a velocity of 3 to 4 feet per second.

As a result, the bed product, or calcine, was dead-roasted to a condition substantially entirely free of sulfur. All the sulfur content of the concentrate was oxidized as sulfur dioxide and the iron sulfide was reduced to iron oxide. In addition, a considerable portion of the remaining impurities were volatilized.

In the gaseous product exiting from the fluo-solids bed reactor a considerable quantity of copper and iron sulfide dust was suspended. Therefore, the gaseous reactor product was passed through conventional dust-collecting means, and the dust recovered thereby was mixed with the substantially sulfur-free calcine bed product. The cleansed reactor gases emerging from the dust-collecting means contained more than 7 percent sulfur dioxide and thus were conserved for the production of sulfuric acid.

Other amounts of the unroasted concentrate were passed through filtering apparatus and mixed with cement copper or other secondaries to form a wet concentrate mixture containing from about 13 to about 18 percent water. Based upon the iron sulfide content of this wet concentrate, a particular amount thereof was mixed with the dead-roasted calcine (which was either substantially free of sulfur or contained minimal amounts from the reactor dust mixed therewith) to give a copper sulfide and iron sulfide ratio in the blend substantially equal to that desired in the finished matte. In one embodiment of the method, a screw-type mixer was used in which the calcine entered the mixing screw first and the moist concentrate was added next. A certain amount of steam was evolved but the moisture content of the blend could be controlled from a hot dry condition to a warm damp condition depending upon the proportions mixed and the initial temperature of the calcine. Advantageously, the blended product was sufficiently cool for easy handling and contained about 6 percent moisture. Further copper-bearing secondaries and fluxes can be added to the blend at this stage if desired.

This blend was easily balled in any suitable manner with a coating of burned lime to produce a smelter charge in pellet form. Additional water may be added to the blend as necessary to facilitate this balling step.

The blended smelter charge in pellet form was later taken to the smelter. Very little of the difficult problems in handling conventional smelter charges was encountered while transporting this new type of pellet charge because it was substantially dust-free and did not tend to disintegrate into dust-forming powder. Thus, it was not necessary for personnel working in the area to use respirators or the like.

Upon demand, this smelter charge was introduced into a conventional reverberatory furnace where any residual moisture in the pellets was immediately volatilized and the copper and iron sulfides present melted together to form a matte of the desired composition. The other constituents of the charge melted separately from the matte to form a slag which was discarded. The matte was then delivered while molten to a converter where the iron sulfide was removed and the copper sulfide was reduced to a metallic copper.

There are, of course, many variations to be made in this particular example of the new method without departing from the scope of the invention. For example, a roasting furnace other than a fluo-solids reactor may be used to calcine the concentrate. However, if it is desired to dead-roast the calcine according to the invention into a substantially sulfur-free product, then a fluo-solids reactor is probably necessary. Also, various means for blending the calcine and the correct amount of wet concentrate may be employed other than the screw-type apparatus described above. For example, a dragline-type mixer may be used to advantage under certain circumstances. Furthermore, the introduction of secondary air at an intermediate point in the fluo-solids reactor described may not be necessary under some conditions, so long as bed depth is maintained. These are only some of the many changes contemplated by the invention in the specific embodiment described above.

It is apparent that this new method constitutes a considerable improvement over the art in providing a blend of wet concentrate and dry calcine and in providing for dead-roasting of the calcine such that it is substantially sulfur-free. As a result, only an absolute minimum of roasting is necessary in the new process and a considerable saving is effected in time, labor and fuel costs. Moreover, the addition of wet unroasted concentrates to the minimum amount of dusty calcine makes a slightly damp smelter charge possible with little of the common dust-control problems. When dead-roasting and wet-blending are both carried out in accordance with the invention, the preponderance of wet concentrate in the blend relative to the hot and dry calcine results in ideal moisture conditions for balling and easily handled smelter pellets can be made quite readily.

I claim:

1. In a matte smelting process for the treatment of sulfidic copper ore in which said ore is treated to produce a wet concentrate relatively rich in copper and having a sulfur content greater than is required to form matte with the copper that is present, and in which said concentrate is in part roasted to form a calcine from which a substantial portion of the sulfur has been eliminated, and said calcine is then intimately blended with unroasted concentrates to form a smelting charge having copper and sulfur present in the correct proportions to form matte, the improvement comprising pre-blending the hot roasted calcine promptly with wet unroasted concentrates containing enough moisture to make the resulting furnace charge substantially dustless before charging into the smelting furnace, whereby such charge may be handled and charged into the smelting furnace without evolution of dust and may be melted with minimum dust losses from the smelting furnace.

2. In a matte smelting process for the treatment of sulfidic copper ore in which said ore is treated to produce a wet concentrate relatively rich in copper and having a sulfur content greater than is required to form matte with the copper that is present, and in which said concentrate is in part roasted to form a calcine from which a substantial portion of the sulfur has been eliminated, and said calcine is then intimately blended with unroasted concentrates to form a smelting charge having copper and sulfur present in the correct proportions to form matte, the improvement comprising pre-blending the hot roasted calcine promptly with wet unroasted concentrates containing enough moisture to make the resulting furnace charge substantially dustless and pelletizing said charges into pellet form before charging into the smelting furnace, whereby such charge may be handled and charged into the smelting furnace without evolution of dust and may be melted with minimum dust losses from the smelting furnace.

References Cited in the file of this patent

UNITED STATES PATENTS

| | | |
|---|---|---|
| 1,169,069 | Dwight | Jan. 18, 1916 |
| 1,238,279 | Dwight | Aug. 28, 1917 |
| 1,811,920 | Dickson | June 30, 1931 |
| 2,039,062 | Debuch | Apr. 28, 1936 |
| 2,094,275 | Mitchell | Sept. 28, 1937 |
| 2,129,760 | Greenawalt | Sept. 13, 1938 |
| 2,194,454 | Greenawalt | Mar. 19, 1940 |
| 2,556,215 | Queneau et al. | June 12, 1951 |
| 2,668,107 | Gordon et al. | Feb. 2, 1954 |
| 2,716,600 | Frick et al. | Aug. 30, 1955 |
| 2,719,082 | Sproule et al. | Sept. 27, 1955 |